Dec. 24, 1929. C. G. NESSLER Re. 17,536

HEATER FOR WAVING HAIR

Original Filed July 11, 1923

INVENTOR
Charles G. Nessler
BY
Willis Foster
His ATTORNEY

Reissued Dec. 24, 1929 Re. 17,536

UNITED STATES PATENT OFFICE

CHARLES G. NESSLER, OF NEW YORK, N. Y., ASSIGNOR TO THE NESTLE-LE MUR COMPANY, OF NEW YORK, N. Y., A CORPORATION OF OHIO

HEATER FOR WAVING HAIR

Original No. 1,595,808, dated August 10, 1926, Serial No. 650,784, filed July 11, 1923. Application for reissue filed August 4, 1928. Serial No. 297,448.

My invention relates to heating devices which are adapted for use in the art of waving hair, and the improvements are especially applicable to heaters which are now used so extensively in the process of waving natural hair on the head of the subject, and which derive their heat from an electric current. In using these heaters, the hair in strand form is wetted and then wound around a rod in helical turns and is then covered or not with absorbent material and inserted within the bore of the electric-heater, after which the current is applied for several minutes and until the heat is run up to quite high degree, generally to the boiling point. Under this condition the heater body becomes too hot to be grasped directly in the hand of the operator who has to manipulate the heater and remove it. In this process, the head-end of the heater is usually provided with a closure for aiding the process and also for keeping the vapors and heat away from the scalp of the subject and heat insulating or protecting means are often used. My present invention provides hand grasping means or handles for the heater which are kept from becoming highly heated; also means for detachably applying a closure to the head-end of the heater, as well as means for protecting the head or scalp of the subject from the heated end of the body of the heater. Other provisions are also made by my present improvements which will appear in the description hereinafter given.

I have illustrated an embodiment of my inventions in the accompanying drawings, wherein.

Figure 1:
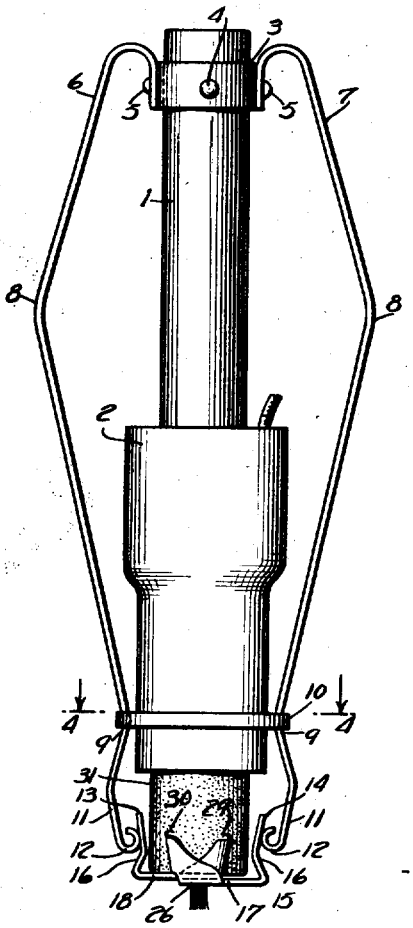
Fig. 1, shows a side elevation of my improved heating device. with the closure applied to the head-end thereof and in closed position and with the combined handles and gripping means in clamping engagement with the said closure.

Referring to the drawings, 1 indicates a tube open at both ends and provided near the head-end with a surrounding casing 2, within which is arranged the usual electric heating coils which need not be here illustrated, the said parts 1 and 2 being secured together. This structure is the ordinary one used so generally in the process of permanent waving of natural hair on the head of the subject, an electric wire being connected with the structure to furnish the heating current and the structure being suspended overhead by suitable means not shown, groups of two or three dozen being so arranged as often that number are used for waving the hair of the subject.

Figure 3:
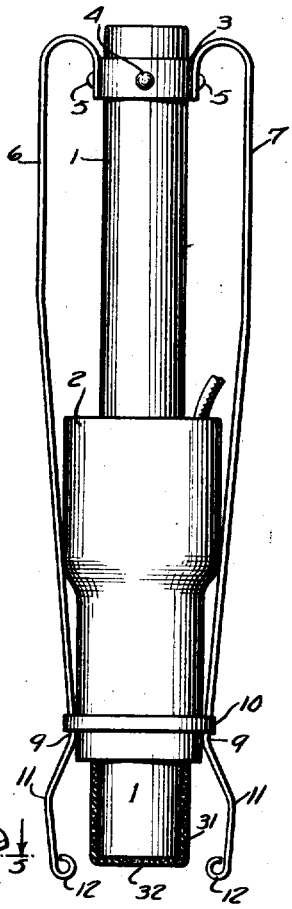
Fig. 3, is a similar view to that shown in Fig. 1, with the resilient handles or grasps pushed inwardly towards the shell to release the gripping jaws from the closure, the latter being removed.

For this structure, I provide a simple and efficient hand-grasping means which retains comparatively little of the heat of the attached body part or shell, said means at the same time serving as clamping means for the closure which I apply to the head-end of the device. At the outer end of the tubular structure distant from the head-end, I mount a collar 3, by means of a pin 4, and to this collar I secure by screws 5, the respective ends of the hand-grasps 6 and 7, which are made of resilient material in strip form and are constructed alike. These arms or handles 6 and 7, extend longitudinally of the shell structure and practically the length thereof, and they are spaced laterally apart so as to lie diametrically opposite each other. The arms are bowed or bent outwardly from the shell as at 8, and near the head-end they are bent sharply inwardly as at 9, for the reception of a loose retaining band or ring 10, which surrounds the arms and keeps them close to the exterior of the shell, at the same time to permit of the arms having an endwise movement with respect to the shell, when the arms are pressed inwardly towards the same, the band 10, at such time moving with the arms, as indicated in Fig. 3.

The free ends 11, of the arms 6 and 7, which lie at the head-end of the body member of the heater, form clamping jaws for engaging and clamping the inwardly extending projections 13 and 14, on the closure 15, which is detachably mounted upon said end of the device. The extreme ends of the spring-arms or bars 6 and 7, are rolled inwardly, as at 12, so as to form rib-like parts which engage the bends or indentations 16, respectively, in the projections 13 and 14, of the removable closure 15.

Figure 2:
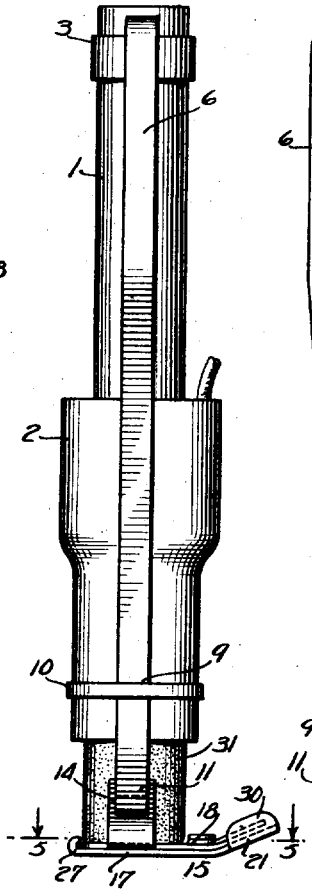
Fig. 2, shows a side elevation of the same, taken at right-angles to the view in Fig. 1.
Figure 4:
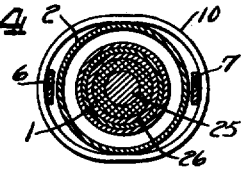
Fig. 4, is a cross-sectional view of the device, the plane of the section being indicated by lines 4—4, in Fig. 1.
Figure 5:
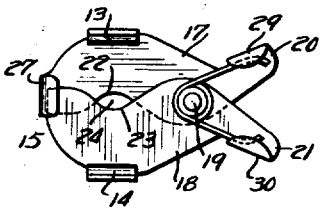
Fig. 5, is an end view of the closure shown as detached.
Figure 6:
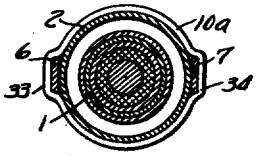
Fig. 6, is a cross-sectional view of the device, showing a modified form of the retaining band and sliding connection between the same and the resilient handle members.

The closure 15, comprises a pair of members or plates 17 and 18, which are shaped as shown in plan in Fig. 5, and are pivoted together at 19, the member 17, having a handle 20 and the member 18, having a handle 21, so that they together form somewhat of an X-shaped structure. The opposing edges of the members 17 and 18, are formed with corresponding notches 22 and 23, which when the members are closed provide an opening 24, for the reception of the curler rod 25, and the wound hair 26, as indicated in Figs. 1, 4 and 6. The outer ends of the two closure members are kept together when closed, by means of the end of blade 18, taking into a groove formed by the bent-over ear 27, on the end of blade 17 and this arrangement serves to maintain the adjacent faces of said plates in close contact, as shown in Figs 2 and 5. A spring 28, carried by the pivot 19, of the blades, has its respective ends in engagement with the finger pieces or lugs 29 and 30, on the ends of the respective handles 20 and 21, of the closure plates 17 and 18. This spring acts to normally keep the handles apart and the plates closed, as shown in Fig. 5, and when the two handles are pressed together by the fingers of the operator, the closure plates are opened so that they may then be placed over the head-end of the heater shell, whereupon the release of said handles causes the spring to come into play and clamp the said plates 17 and 18, against the exterior of said hair. The closure is also clamped in suspended position against the end of the shell or body part, by means of the jaws 11, 11, on the free ends of the arms 6 and 7, said jaws engaging the outside of the inwardly projecting pieces 13 and 14, of the closure, as hereinabove described. The bars 6 and 7, being formed of resilient material and being held near the said jaws by the retaining band 10, exert a spring clamping action on said jaws which is imparted to the projections engaged thereby.

The head-end of the heating shell is provided with a protecting-cap 31, made of felt or suitable fibrous material and fitted snugly over the end of said shell so as to extend well down on the exterior thereof and also to cover the end of the same, the closed end of said cap being formed with an orifice 32, for permitting the curler rod with the wound hair thereon to extend through the cap into the interior of the shell. This substantially large felt cap serves to protect the head of the subject from the heated end of the shell and to that extent increases the comfort accompanying the use of the device.

In Fig. 6, I show a modified form of the retaining band or ring which engages the exterior of the resilient bars 6 and 7, and which in the first form is shown as oval shaped at 10, in Fig. 4. In the modification, the band is circular in plan as at 10ª, and at opposite points is provided with recesses or bands 33 and 34, for the reception of the respective bars 6 and 7, which slide therethrough.

In using the device, the strand of hair 26, being wound on rod 25, and tied thereto in the usual way and the hair wetted and, if preferred, wrapped in wetted absorbent material, then placed in a steaming-tube and this assemblage is inserted in the interior of the heating shell, the side handles 6 and 7, of which are grasped in the hand of the operator and pressed together so as to open the jaws 11, 11, whereupon the closure is applied by pressing together its handles and opening its plates so as to pass them around the wound strand of hair and place the inner face of the same in contact with the felt covered end of the shell. When the closure is thus seated in place, the resilient bars 6 and 7, are released and the jaws thereof close against the projections on the closure plates and hold them as shown in Figs. 1 and 2. The electric current is then applied and the process carried out as above stated.

The combined hand-grasps and clamping means in the form of the resilient strips, provide a surrounding cage-like structure, which is kept comparatively cool because the heat from the heater cannot well be conveyed to it and in addition to having the lateral movement relatively to the body of the heater when grasped and squeezed, it also has an endwise creeping movement on said body.

Having thus described my invention, what I claim and desire to secure by Letters Patent is:

1. A heater for use in waving hair having a plurality of hand-grasps disposed on the exterior thereof and spaced laterally therefrom and spaced from each other circumferentially of the heater and made fast at one end with the other end free to permit longitudinal movement thereof.

2. A heater for use in waving hair having a set of hand-grasps comprising a plurality of longitudinally extending laterally yielding bars arranged along the sides of the heater and spaced laterally therefrom and spaced from each other so that the heater is intermediately disposed with respect to the hand-grasps.

3. In a heating device, a shell, a detachable closure means for one end of said shell, a set of arms mounted upon said shell in laterally spaced apart relation, said arms being secured at one end and provided at the other end with a jaw for engaging said closure to hold it in place on the end of said shell, said arms being actuated to release the jaws from said closure by pressing said arms towards the shell.

4. In a heating device, a shell, a detachable closure for one end of said shell, resilient arms mounted on said shell and having free ends adapted to engage and clamp said closure in place when applied to its end of said shell, said arms being spaced laterally from said shell and serving as hand-grasps in manipulating said device.

5. In a heating device, a shell, a detachable closure for one end of said shell, resilient arms mounted upon the exterior of said shell, one end of each arm being secured to a fixed point and the other end being left free to engage said closure, means for slidably engaging said arms intermediate their ends.

6. In a heating device, a tubular part, resilient arms secured upon the exterior of said part and spaced away therefrom and spaced away from each other laterally, said arms being fixed at one end and free at the other, a closure detachably applied to one end of said part and engaged and held in place by the free ends of said arms, a member extending loosely around the exterior of said arms in sliding engagement therewith and permitting endwise movement of said arms when they are squeezed towards said part.

7. In a heating device, a tubular part, resilient arms mounted upon the exterior of said part with the main portion of each arm bent outwardly and spaced away from said part, one end of each arm being attached to said part and the other end free, a closure for one end of said part engaged and clamped in place by the free ends of said arms, said arms each being bent inwardly at corresponding places, a band loosely engaging said arms at the inward bends and permitting a sliding movement of the arms beneath the band.

8. In a heating device, a shell, a closure for detachable application to one end of said shell, said closure comprising a pair of members pivoted together so as to open and close on each other, corresponding notches formed in the opposing edges of said members for the reception of a part between them when closed on each other, a spring for normally keeping said members closed on each other, each member being provided with a projection for engaging the shell to clamp the closure to the end thereof.

9. In a heating device a tubular part, spring actuated clamping jaws mounted on said part and normally held closed, a closure for one end of said part for detachable application thereto, said closure being provided with projections engaging said part to hold the closure in place, said projections being engaged by said clamping jaws.

10. In a heating device for waving natural hair on the head, a shell in which the wound-hair is inserted for waving and means for heating said shell, a protecting cap formed of fibrous material and provided with an orifice of restricted size in its closed end, said protecting cap fitting over the end of said shell which lies adjacent the head and covering the edge of said shell and extending down over its sides.

11. In a heating device, a tubular-member and a detachable closure for one end thereof, said closure and tubular-member being provided with interengaging spring attaching-ing means for detachably securing them together.

12. In a heating device, a tubular-member and a detachable closure for one end thereof, said closure being provided with projecting parts and said tubular-member being provided with spring means for interengaging with said projecting parts of said closure and detachably securing the latter in place.

13. In hair waving apparatus, a closure clip comprising pivoted closure plates, and a spring anchored to said pivot and having free arms engaging the respective plates and acting to normally force them into closed positions.

14. In the process of hair waving, a support, a clip for detachable connection to said support, comprising a pair of formed members pivoted together near one end so as to open and close on each other at the other ends, said other ends overlapping each other, a spring for normally keeping said members closed on each other and on said support and adapted to take up any yield of said support.

15. In hair waving apparatus, a closure clip comprising relatively movable closure members constructed and arranged to close the end of a heater and to embrace the inserted hair-strand, said members being provided with handles for moving them into open position, lugs on said handles and spring means acting normally on said lugs to forcibly close said members.

CHARLES G. NESSLER.